US009799075B2

(12) United States Patent
Crutchfield et al.

(10) Patent No.: US 9,799,075 B2
(45) Date of Patent: *Oct. 24, 2017

(54) RANDOM-TIME AUCTIONS IN AN ELECTRONIC TRADING SYSTEM

(71) Applicant: NYSE Group, Inc., New York, NY (US)

(72) Inventors: Steven G. Crutchfield, New York, NY (US); Amy Joy Farnstrom, Oakland, CA (US); Todd Wesley Hohman, Morristown, NJ (US)

(73) Assignee: NYSE Group, Inc., New York, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/548,840

(22) Filed: Nov. 20, 2014

(65) Prior Publication Data

US 2015/0081512 A1    Mar. 19, 2015

Related U.S. Application Data

(63) Continuation of application No. 14/145,653, filed on Dec. 31, 2013, now Pat. No. 9,741,075.

(60) Provisional application No. 61/747,714, filed on Dec. 31, 2012, provisional application No. 61/798,249, filed on Mar. 15, 2013.

(51) Int. Cl.
*G06Q 40/04* (2012.01)

(52) U.S. Cl.
CPC ................... *G06Q 40/04* (2013.01)

(58) Field of Classification Search
CPC ........ G06Q 10/00; G06Q 20/00; G06Q 30/00; G06Q 40/00
USPC ....................................... 705/3–44
See application file for complete search history.

(56) References Cited

U.S. PATENT DOCUMENTS

| | | | | |
|---|---|---|---|---|
| 7,769,672 B2 * | 8/2010 | Keith | ............... | 705/37 |
| 7,774,246 B1 | 8/2010 | Keith | | |
| 7,835,975 B1 * | 11/2010 | Keith | ............... | 705/37 |
| 7,860,796 B2 | 12/2010 | Levy | | |
| 7,882,007 B2 * | 2/2011 | Keith | ............... | 705/37 |
| 7,890,415 B1 * | 2/2011 | Keith | ............... | 705/37 |
| 7,908,198 B1 * | 3/2011 | Keith | ............... | 705/37 |
| 7,941,364 B2 * | 5/2011 | Peterffy et al. | ............... | 705/38 |
| 8,041,628 B2 | 10/2011 | Waelbroeck et al. | | |
| 8,392,314 B1 * | 3/2013 | Epstein et al. | ............... | 705/37 |
| 8,489,493 B2 * | 7/2013 | Nager | ............... | 705/37 |
| 8,799,138 B2 * | 8/2014 | Keith | ............... | 705/37 |
| 2006/0026090 A1 | 2/2006 | Balabon | | |
| 2007/0005488 A1 * | 1/2007 | Keith | ............... | 705/37 |
| 2009/0281954 A1 | 11/2009 | Waelbroeck et al. | | |

(Continued)

*Primary Examiner* — Frantzy Poinvil
(74) *Attorney, Agent, or Firm* — DLA Piper LLP (US)

(57) ABSTRACT

A system is configured to hold price improvement auctions for customer orders for a duration that is based on a random timer. The system receives an initiating order from an auction guarantor that describes the financial instrument that a customer wishes to trade. The auction guarantor provides a guaranteed order that can fill the initiating order. A random time period to hold the auction is selected. The system solicits responses from other market participants for the financial instrument. When the random time period expires the system matches the initiating order against the responses, existing orders in an order book, and the guaranteed order.

26 Claims, 3 Drawing Sheets

(56) References Cited

U.S. PATENT DOCUMENTS

2010/0268605 A1* 10/2010 Waelbroeck et al. ...... 705/14.53
2010/0332373 A1* 12/2010 Crabtree et al. ................ 705/37
2011/0071935 A1* 3/2011 Balabon .......................... 705/37
2014/0188688 A1 7/2014 Crutchfield et al.

* cited by examiner

RANDOM-TIME AUCTIONS IN AN
ELECTRONIC TRADING SYSTEM

TECHNICAL FIELD

The disclosure generally relates to the field of electronic trading systems and in particular to administering auctions in an electronic trading system.

BACKGROUND

An electronic trading system provides a central market place where both buyers and sellers (often referred to as traders or market participants) can buy/sell financial instruments. Traders connect to the electronic trading system via their own trading computers, which can receive market data from the electronic trading system, and which can issue commands to buy or sell specific financial instruments. The issuance of commands to buy or sell financial instruments from a trading computer to the electronic trading system is called electronic trading (or in this application, simply trading). Because the function of electronic trading systems is to facilitate the market for various financial instruments, the electronic trading systems are sometimes called electronic markets or electronic exchanges.

Agency brokers are entities that can issue orders to trade to the electronic trading system on the behalf of other parties. Traders may be required to hold a specific permit before being allowed to act as agency brokers with an electronic trading system. For example, traders must possess an Amex Trading Permit (ATP) in order to act as agency brokers with the New York Stock Exchange (NYSE) Amex options trading platform—for this reason agency brokers are also called ATP Holders in the context of the Amex options trading platform.

Electronic trading systems support a number of common order types that can be submitted into the market. Two types of common orders are: limit orders and market orders (the latter also referred to as "at market" orders). A limit order is an order to buy or sell a set number of financial instruments at a pre-determined price or better. Better is a higher price when selling, and a lower price when buying. A market order is an order to buy/sell a set number of financial instruments at the prevailing market price until the specified quantity has been met or the order cancelled. A market order has no price at which to trade, rather just a quantity of lots. A market order is executed at whatever price is currently prevailing in the market.

When a market participant issues an order to an electronic trading system to sell a financial instrument, the electronic trading system will attempt to match the sell order with an existing buy order that has a price that satisfies the seller's price requirements. Similarly, when a market participant issues an order to buy a financial instrument, the electronic system will attempt to match the buy order with an existing sell order. If the order that is issued by a market participant is a limit order, but that order is not marketable (i.e., there is no matching counterparty order that meets the limit order's price requirements), then the limit order will be stored in an electronic order book. The electronic order book will store the unexecuted order according to the rules of the electronic exchange until a counterparty with a matching order can be found to execute the trade, or until the order is cancelled. The orders to buy that are stored in the order book are called bids, while the orders to sell are called offers. The difference between the highest bid on the order book and the lowest offer is called the bid-offer spread or buy-sell spread.

Price information about bids and offers for equity option contracts in various electronic markets in the United States are tracked by the Options Price Reporting Agency (OPRA), OPRA maintains a database of the best bids and offers for each tracked option called the National Best Bids and Offers (NBBO) database.

Agency brokers may provide trading services for large volumes of customers, and may also trade for their own account, subject to the rules and regulations of the electronic markets and of the SEC. When a customer places an order to buy or sell equity options through an agency broker, the agency broker may have existing customer orders that can be matched against the order, or the agency broker may be able to act as a counterparty directly by trading for their own account. However, instead of directly executing such orders internally, an agency broker may be required, by rules or regulations, to place an order with an electronic exchange in case a third-party is willing to offer a better price for the customer's order than that offered internally by the agency broker. An electronic trading system may facilitate such orders by using an auction mechanism, where the customer order is made public, and offers from potential counterparties are received. An auction system is advantageous in that it opens up the customer order to price improvement from many different potential counterparties. However, a fixed-duration auction is open to abuse as potential counterparties have an incentive to wait till the auction is about to expire before revealing the price they are willing to pay in order to prevent competition from improving on their offers before expiration of time. Thus there is a need for a system that provides price improvement in the manner of a fixed-duration auction, but which is not open to exploitation as described.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a system (and method and computer instructions) configured to provide price improvement for a customer order in an electronic trading system. The system receives, at a computing system, an initiating order from an auction guarantor. The auction guarantor acts as a broker for the customer and the initiating order describes a financial instrument, a volume, and an initiating price, and possibly the initiating party's information. The system initiates a random timer configured to run for a random time period. In one example embodiment, the random time period may be bounded within a predefined range of a minimum time period and a maximum time period. One skilled in the art will readily recognize that there exists a variety of random timers, which depending on the timer provide either truly (non-pseudo) random or pseudo-random time periods. An auction initiation message is then broadcast to a plurality of market participants including agency brokers and brokers.

A plurality of auction participant responses are received from one or more auction participants, where the auction participants comprise a subset of the market participants. Each auction participant response includes price and volume information for an auction participant.

The system determines if the random timer has terminated, and if it has, it matches the auction participant responses, existing orders in an order book of the electronic trading system, and a contra guarantee order, against the initiating order.

System Architecture

Figure 1:
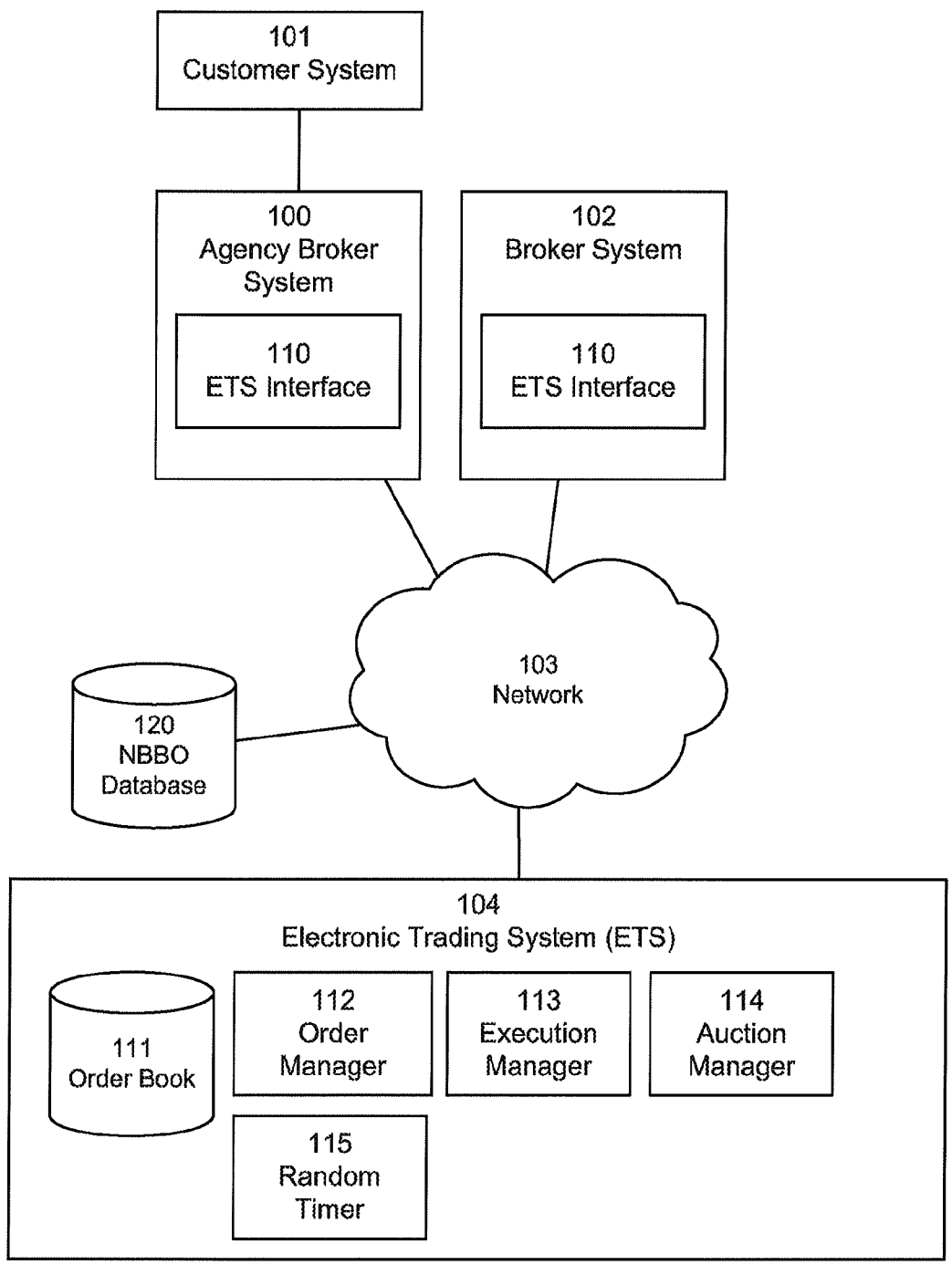
FIG. 1 is a high-level block diagram illustrating an embodiment of an electronic trading system for administering a random-time auction, operating in a networked environment.

Turning now to FIG. 1, illustrated is a system architecture diagram of one example embodiment of an electronic trading system (ETS) for administering a random-time auction in networked environment. The system environment comprises one or more customer systems 101, agency broker systems 100, and broker systems 102 coupled to the ETS 104 through a network 103. The ETS 104 also communicates with the NBBO database 120 through the network 103. Although only a single one of each of the customer systems 101, agency broker systems 100, and broker systems 102 is illustrated in FIG. 1, the environment may include a plurality of each in practice.

The customer systems 101 are systems operated by customers that can issue electronic orders to buy or sell financial instruments in accordance with the needs of those customers. The customer systems 101 communicate the electronic orders to the agency broker systems 100, either directly or through the network 103. The customer systems 101 may be personal computers, laptops, smart phones, tablet computers, computer servers, or any other systems capable of issuing electronic communication.

The agency broker systems 100 are operated by agency brokers and are configured to receive electronic orders from a plurality of customer systems 101. The agency broker systems 100 include an ETS interface 110 that enables communication with the ETS 104, The agency broker systems 100 can issue orders to buy and sell financial instruments on behalf of customers or they may issue orders for the agency brokers' own accounts. Orders are sent through the ETS interface 110 to the ETS 104. Confirmations of issued orders are received through the ETS interface 110 as well. The ETS interface 110 also enables agency brokers to initiate price improvement auctions with the ETS 104, to provide price improvement for customer orders. The ETS interface 110 may provide standard electronic communications capabilities such as encryption, compression, routing, quality of service guarantees, error correction, etc.

The broker systems 102 are similar to the agency broker systems 100 in that they issue orders to buy and sell financial instruments with the ETS 104; however, the broker systems 102 are operated by brokers that do not place orders on behalf of customers. The broker systems 102 may also include an ETS interface 110 that enables brokers to communicate with the ETS 104 to participate in price improvement auctions. The ETS interface 110 allows the broker systems 102 to send bids to the ETS 104 during a price improvement auction, and also allows the broker systems 102 to receive prices, bid confirmation, and other auction related information from the ETS 104.

The ETS 104 is an electronic market that matches orders received from the various entities against each other, including orders from the broker systems 102 and agency broker systems 100. For instance, the ETS 104 can match an order to sell a particular financial instrument from one broker against a different order to buy the same financial instrument from another broker, based on the price criteria of the two orders being compatible.

The ETS 104 also enables the agency broker systems 100 to initiate price improvement auctions on the behalf of their customers. To initiate a price improvement auction on the behalf of a customer, an agency broker system 100 sends an "initiating order" to the ETS 104 containing information identifying the financial instrument to be traded, the side of the transaction (whether the instrument is to be bought or sold), a contra guarantee price (including, but not limited to, i.e. a facilitation or solicitation price), and the quantity to be traded. The ETS 104 then broadcasts an auction initiation message to other agency broker systems 100 and broker systems 102. The auction initiation message contains information about the financial instrument that is the subject of the auction, information about the quantity, side, and initiating price, and may also include information about the initiating party of the auction transaction.

At the designated auction start time the ETS 104 initiates a random timer and begins to receive "auction participant responses" from the participants in the auction such as the agency broker systems 100 and the broker systems 102. The auction participant responses each contain information about the price at which a participant is willing to buy and/or sell the auctioned financial instrument, and the quantity of instruments that the participant is willing to buy/sell. The ETS 104 will continue to receive auction participant responses until the random timer terminates.

The agency broker system 100 that initiates the price improvement auction is called the "auction guarantor." As a prerequisite to initiate the price improvement auction the auction guarantor must be willing to act as the counterparty for the entire initiating order, at a price equal or better than the NB130. The price offered by the auction guarantor is the contra guarantee price. The auction guarantor's guarantee to execute the entire initiating order at the contra guarantee price constitutes an implicit "guaranteed order."

Once the random timer indicates that the auction time has elapsed, the ETS 104 matches the initiating order against the auction participant responses, existing orders in the order book, and the guaranteed order in order of price first. Responses and orders at the same price may be allocated based on priority rules that take into order size of the responses/orders, time, and preference rules. The auction mechanism and the prioritization for the order allocation are explained in more detail herein.

One skilled in the art will readily recognize that the principle described herein also apply to other types of auctions, including, but not limited to, Facilitation auctions, Solicited auctions, Price Improvement ("PI") auctions, single-side complex order auctions, complex-directed auctions, and combinations thereof, and the like. Furthermore, particular embodiments of the present invention comprise any auction associated with an auction initiation message.

Electronic Trading System

In the illustrated embodiment the ETS 104 includes an order book 111, an order manager 112, an execution manager 113, an auction manager 114, and a random timer 115.

The order book 111 is a data storage module that stores orders received from the agency broker systems 100 and the broker systems 102. The orders are stored in records that include information describing the order such as the financial instrument the order is for, the price the party is willing to buy/sell, the identity of the party the order is for, the time duration the order is valid for, the time the order was placed, the number of instruments the party wishes to buy/sell, etc. Not all of this information will be included in each order record and other information, not mentioned above, may also be included in the order records. The ETS 104 may provide information from the order book 111 to the agency broker systems 100 and the broker systems 102 on request. This information may be used by the agency brokers and brokers to determine the price of various financial instruments in the current market. Some information from the order book 111 may be withheld from agency brokers and brokers. For example, the price, and quantity of a buy order stored in the order book 111 may be provided to inquiring parties, but the identity of the party that made the order may be withheld in order to protect their anonymity.

The order manager 112 matches buy and sell orders in the order book 111 against each other to create transactions. These transactions are matched based on price priority first and time priority next. For example, imagine the order book 111 has three limit orders to sell shares of ACME Company. One order is from broker X, to sell 10 shares of ACME Company at a price of at least $50 per share, received on January $1^{st}$. Another order is from broker Y, to sell 15 shares of ACME Company at a price of at least $50, received on January $2^{nd}$. The final order is from broker Z, to sell 5 shares of ACME Company at a price of at least $40, received on January $3^{rd}$. If a new limit order is received from broker W by the order book 111, to buy 25 shares of ACME Company at a price of at most $55, the 5 shares of broker Z's sell order will be executed against broker W's buy order first, since it offers the best selling price. Next the 10 shares of broker X's sell order will be executed against broker W's buy order, since broker X's sell order was received prior to broker Z's sell order. Finally the remainder of broker W's buy order (5 shares) will be executed against a portion of broker Z's sell order.

The order manager 112 matches orders stored in the order book 111 until no more transactions can be completed. When the possible order matches have been exhausted the lowest priced sell order for a given financial instrument, in the order book 111, will be priced higher than the highest priced buy order. The ETS 104 may report the prices of the lowest priced sell order and highest priced buy order to the NBBO Database 120, which tracks the best buying and selling prices for each financial instrument across all electronic markets in the United States. As new orders are received by the ETS 104, the order manager 112 may attempt to match them against existing orders in the order book 111. Orders that cannot be matched against an existing order will be stored in the order book 111 until they are marketable (i.e., until they can be matched against another order). When market orders are received by the ETS 104 they are executed immediately against the current highest priced buy order or lowest priced sell order stored in the order book 111, regardless of the price.

The execution manager 113 enforces regulations and policies of the ETS 104 over the operation of the order manager 112 and the auction manager 114. One purpose of the execution manager 113 is to ensure that the market orders received by the ETS 104 are not executed at prices that diverge significantly from the best buy and sell prices reported by the NBBO database 120. For example, the execution manager 113 may prevent a transaction matching a market order to buy against a sell order that is priced higher than some threshold above the best selling price reported by the NBBO database 120. The execution manager 113 may force the order manager 112 to route the market order in this case to a different electronic market, since the local price diverges greatly from the price available in other markets.

The auction manager 114 receives requests from agency broker systems 100 to initiate price improvement auctions, manages the auction process, and allocates the initiating order amongst the responses received, the guaranteed order, and existing orders in the order book 111. The auction process begins when the auction manager 114 receives an initiating order from an agency broker system 100 that is designated the auction guarantor. The initiating order contains information identifying the financial instrument to be traded, the quantity to be traded, whether the initiating order is to buy or sell, and the initiating price of the auction. The execution manager 113 may check that the initiating price lies within the range between the best buy and the best sell prices provided by the NBBO database 120 to ensure that the initiating price is fair to the customer on whose behalf the auction is being held Initiating orders that do not meet this criterion may be rejected before the auction is initiated. Once the initiating order is accepted, the auction manager 114 will broadcast an auction initiation message to agency broker systems 100 and broker systems 102 that are connected to the ETS 104. The auction initiation message will inform the agency brokers and brokers of the financial instrument that will be auctioned. The auction manager 114 will broadcast the volume, initiating price, and whether the initiating order is to buy or sell. The auction manager 114 will then activate the random timer 115. The random timer 315 determines how long the auction should be kept open for responses. The auction manager 114 will keep the auction open for responses until the random timer 115 terminates.

The random timer 115 may be configured to run for at least a minimum amount of time, plus some random additional increment of time. The minimum amount of time is selected in order to give auction participants enough time to generate a response in case they wish to participate in the price improvement auction. In one example embodiment, 1000 milliseconds of time may be an adequate minimum duration that allows agency broker systems 100 and broker systems 102 to send in responses, but a larger or smaller minimum duration may be used.

After the random timer 115 has run for the minimum amount of time, a random binary decision may be taken to determine if the random timer 115 should run for additional time. The random binary decision need not be an even probability (50/50) decision between extending the running time and terminating the timer. For example, the random timer 115 may be configured so that it terminates 20% of the time and extends the running time 80% of the time. If the random binary decision indicates that the running time should be extended, then a random increment of time may be added to the running time of the random timer 115. For example, a random value between 1 millisecond and 500 milliseconds may be added to the running time of the random timer 115. Each time the random timer 115 expires the random binary decision may be taken again to determine if the timer should be run for additional time.

The random timer 115 may also be configured to run for at most some maximum amount of time. If a maximum amount of time is selected then the random timer 115 will terminate after it has run for the maximum amount of time, regardless of the outcome of the random binary decision to extend running time. In one example embodiment, 1500 milliseconds may be a sufficient maximum amount of time in a networked electronic trading environment, but other values may also be used.

In response to the auction initiation message, the agency brokers and brokers will decide whether or not they want to participate in the auction, and what volume, side, and price they wish to participate at (if at all). The agency broker systems 100 and broker systems 102 will then send auction participant responses to the ETS 104 containing the quantity they wish to buy/sell, and the price at which they are willing to participate. In one implementation the responses from the auction participants are kept hidden and each participant decides the price and quantity they wish to participate at without knowledge of the responses of the other brokers and agency brokers. In another implementation some or all of the information of the auction participants' responses is made available to each auction participant. For example, the price and/or quantity of each participants' responses may be broadcasted to each participant.

Since the auction participants do not know the duration of the price improvement auction they have a motivation to respond quickly to the bids and offers made by other participants. The auction manager 114 will deal with multiple responses from the same participant by cancelling earlier responses and entering only the latest response into the auction. Each response may be time stamped by the ETS interface 110 so that they can be ordered by the auction manager 114.

The auction manager 114 will match the initiating order against the auction participant responses, the contra guarantee order, and existing orders stored in the order book 111, using a prioritization scheme that is configured by the administrators of the ETS 104.

In one implementation the initiating order is matched against responses and orders on the basis of price first and then time. In this implementation customer orders and responses, that is orders and responses placed on the behalf of customers by agency brokers, take precedence over non-customer orders and responses at the same price. When two customer orders or responses have the same price, the order or response with the earlier time takes priority. On the other hand, if two or more non-customer orders or responses have the same price the initiating order is allocated between them on the basis of a size pro rata allocation that takes into account the size of each order or response at that price. Only orders and responses that are better than or equal to the initiating price are matched against the initiating order. Customer orders and responses at the initiating price are matched against the initiating order until their entire volume is satisfied. If a portion of the initiating order remains after all orders and responses at a price better than the initiating price and all customer orders at the initiating price have been matched, then the contra guarantee order is matched against 40% of the volume of the initiating order. This 40% volume allocation is reserved for the contra guarantee order to act as an incentive and reward to the agency broker system 100 that initiated the price improvement process. Any remaining portion of the initiating order is then matched against non-customer orders and responses according to the size pro rata allocation.

Computing Machine Architecture

Figure 2:
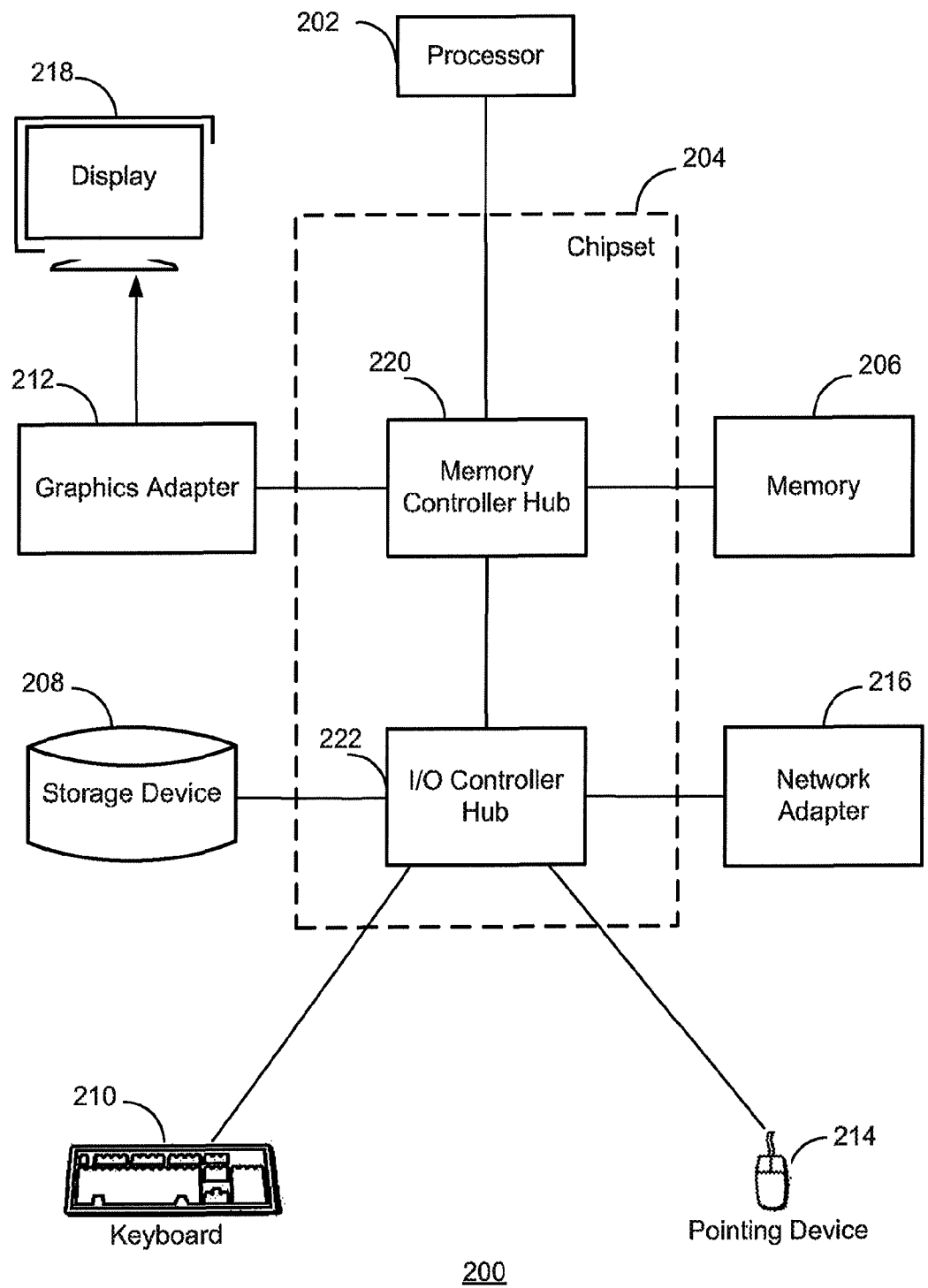
FIG. 2 is a high-level block diagram illustrating an example computer.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (110) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the 110 controller hub 222. Other embodiments of the computer 200 have different architectures.

The storage device 208 is a non-transitory computer-readable storage medium such as a hard drive, compact disk read-only memory (CD-ROM), DYD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the EMS 104 might comprise multiple blade servers working together to provide the functionality described herein. The computers 200 can lack some of the components described above, such as keyboards 210, graphics adapters 212, and displays 218. For example, the EMS 104 can run in a single computer 200 or multiple computers 200 communicating with each other through a network such as in a server farm.

Auction Process

Figure 3:
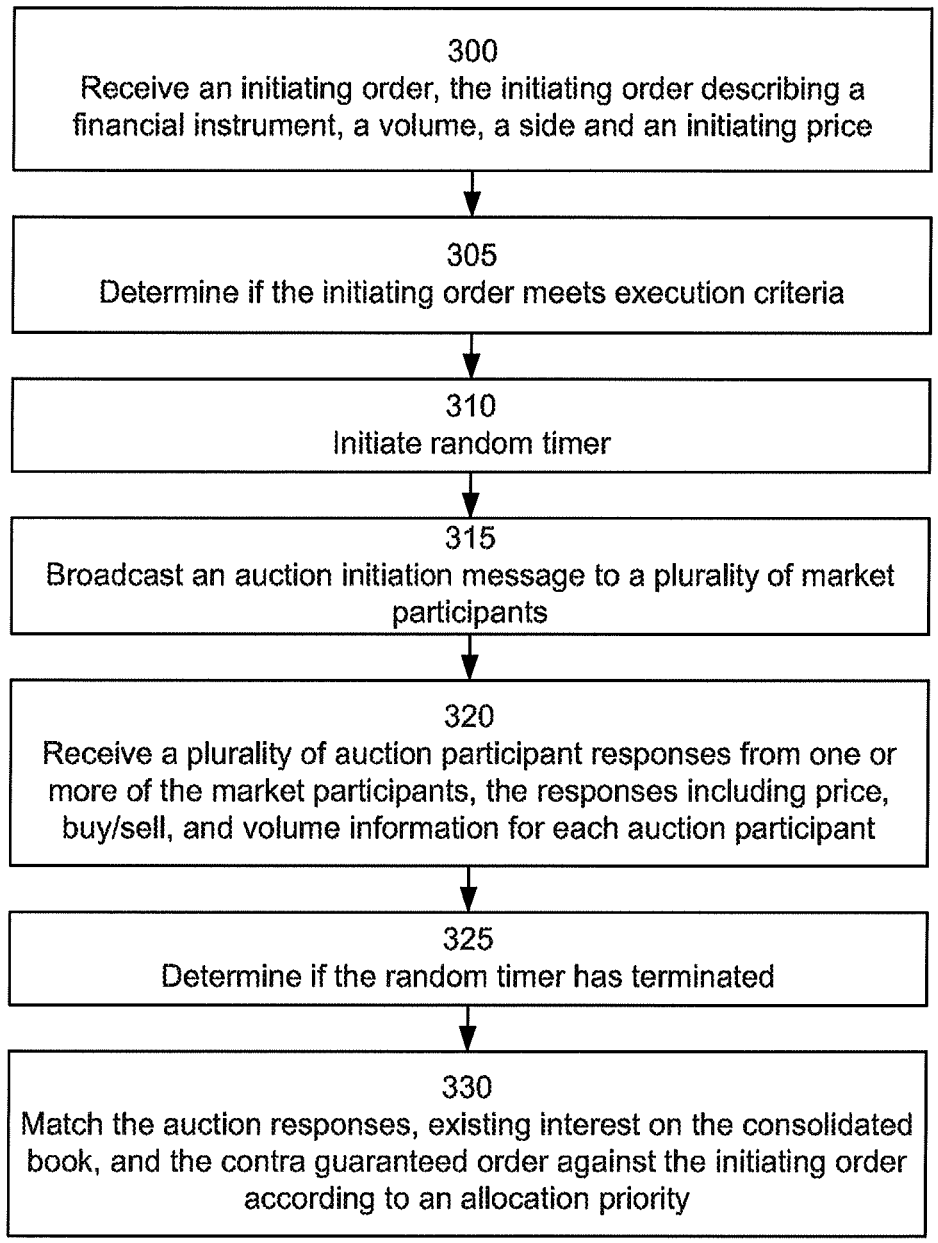
FIG. 3 is a flowchart illustrating a method for administering a random-time auction to provide price improvement in an electronic market.

Referring now to FIG. 3, illustrated is a flowchart of an example method for administering a random-time price improvement auction in the ETS 104. As a first step the auction manager 114 of the ETS 104 receives an initiating order 300 from an agency broker that acts as the auction guarantor. The initiating order includes information describing the financial instrument that will be auctioned, the volume that will be auctioned, the side, and the initiating price that is offered by the auction guarantor. The initiating price and the volume together constitute an implicit guaranteed order by the auction guarantor. The execution manager 113 determines 305 if the initiating order meets the execution criteria for the ETS 104. As described earlier, this may include determining if the initiating price is within the range of the best buy and sell prices for the financial instrument provided by the NBBO database 120.

If the execution criteria are met, then the random timer 115 is initiated 310. The random timer 115 is configured to run for a time period that is random or pseudo-random. After the timer is initiated, an auction initiation message is broadcasted 315 to each market participant, i.e. to all the agency broker systems 100 and broker systems 102 connected to the ETS 104.

The auction manager 114 then receives 320 a plurality of auction participant responses from one or more of the market participants. The auction participant responses include price and volume information at which each auction participant is willing to participate in the auction.

The auction manager 114 determines 325 if the random timer 115 has terminated. When the random timer 115 has terminated, the auction manager 114 matches 330 the auction participant responses, existing orders in an order book 111, and a contra guarantee order, against the initiating order according to an allocation priority. The contra guarantee order is an order guaranteeing by the auction guarantor a 100% fill of the initiating order in the event that responses to the auction's initiation message are not sufficient to fill the initiating order, The allocation priority, as described above, may give preference to customer orders/responses over non-customer orders/responses, and may match orders/responses against the initiating order by price priority first and time priority second. In addition, non-customer orders/responses may be matched against the initiating order by pro rata size allocation.

Additional Configuration Considerations

The disclosed configuration beneficially recites a system for providing price improvement auctions that is not vulnerable to exploitation by participants, in the manner of fixed-duration auctions. By providing auctions of random and variable length, the system ensures that auction participants are incentivized to place their bids promptly.

Throughout this specification, plural instances may implement components, operations, or structures described as a single instance. Although individual operations of one or more methods are illustrated and described as separate operations, e.g., the descriptions of FIGS. 1 and 3, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules, for example, as described with the processes corresponding to the descriptions of FIG. 1 or the process described in FIG. 3. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or processors or processor-implemented hardware modules.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the Like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention, This description should be read to include one or at least one and the singular also includes the plural unless it is obvious that it is meant otherwise.

Upon reading this disclosure, those of skill in the art will appreciate still additional alternative structural and functional designs for a system and a process for providing random time length price improvement auctions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. An automated computing system implemented method for reducing data surges, comprising:
   in a system environment comprising one or more broker system computers in communication with a computing system through a network:
   receiving, by the computing system, an initiating order from among said one or more broker system computers associated with an auction guarantor, the computing system comprising at least one processing device comprising non-transitory memory and at least one processor executing instructions stored in the non-transitory memory;
   automatically activating, by the computing system, an auction manager module when the initiating order is received, the activated auction manager module comprising specialized instructions that, when executed, cause the auction manager module to perform certain initiating functions relating to an auction and auction controls that reduce an influx of auction data to the computing system at or near the end of the auction, the initiating functions comprising:
   automatically initiating a random timer in response to the initiating order, broadcasting an auction initiation message of the auction, via the network, to a plurality of market participants without indicating an auction duration, the market participants comprising the one or more broker system computers, said auction duration ending upon termination of the random timer, receiving, responsive to the auction initiation message, over the network via the one or more broker system computers, one or more auction participant responses from a plurality of auction participants comprising a subset of the market participants only during the auction duration, and declining auction participant responses received after the auction duration, determining that the random timer has terminated, and transmitting, to an order manager module of the computing system, an instruction that the random timer has terminated; and matching, by the order manager module of the computing system and in response to receiving the instruction that the random timer has terminated, only the auction participant responses received during the auction duration, existing orders in an order book, and a contra guarantee order, the contra guarantee order comprising a contra guarantee price, against the initiating order.

2. The method of claim 1, wherein the auction guarantor acts as a broker for a customer, and the initiating order describes a financial instrument, a volume, a side, and an initiating price.

3. The method of claim 1, wherein the random timer is configured to terminate after running for a random time period.

4. The method of claim 1, wherein the market participants comprise agency brokers and brokers.

5. The method of claim 4, wherein the auction participant responses each include price and volume information for an auction participant.

6. The method of claim 1, wherein the initiating, broadcasting, receiving responses, determining, and matching steps are executed responsive to determining that the initiating order meets an execution criteria.

7. The method of claim 1, wherein the matching occurs according to a price-based priority and a time-based allocation priority.

8. The method of claim 1, wherein, the random timer terminates after running for a minimum time period plus some additional random increment of time under a maximum time period.

9. The method of claim 8, further comprising:
determining, by the auction manager module of the computing system, when the random timer has run for the minimum time period;
responsive to determining that the random timer has run for the minimum time period, determining, by the auction manager module of the computing system, when the random timer should continue running based on a random binary decision; and
responsive to determining that the random timer should continue running, running, by the auction manager module, the random timer for an additional random time period.

10. The method of claim 1, further comprising:
automatically activating, by the computing system, an execution manager module when the initiating order is received;
determining, by the execution manager module, when the price of the initiating order is outside of an acceptable range, the acceptable range comprising the range between the best buy and the best sell prices provided by a national best bid and offer (NBBO) database; and
preventing, by the execution manager module, the order manager module from matching existing orders and the contra guarantee order when it is determined that the price of the initiating order is outside of the acceptable range.

11. The method of claim 1, further comprising:
automatically activating, by the computing system, an execution manager module when the order manager module matches an existing order and the contra guarantee order into a matched market order, the matched market order comprising a matched market order price;
determining, by the execution manager module, when the matched market order price is higher than a predetermined threshold above a national best bid and offer (NBBO) database best selling price; and
forcing, by the execution manager module, the order manager module to reject the matched market order and route the existing order and the contra guarantee order to a different electronic market, when it is determined that the matched market order price exceeds the threshold.

12. An electronic computing system for reducing data surges within a system environment that comprises one or more broker system computers in communication with the electronic computing system through a network, the electronic computing system comprising a computer server comprising at least one processor executing computer-readable instructions stored in a non-transitory memory that causes the computer server to:
receive an initiating order from among said one or more broker system computers associated with an auction guarantor;
automatically activate an auction manager module when the initiating order is received, the activated auction manager module comprising specialized instructions that, when executed, cause the auction manager module to perform certain initiating functions relating to an auction and auction controls that reduce an influx of auction data to the computer server at or near the end of the auction, the auction manager module performing the initiating functions to:
automatically initiate a random timer in response to the initiating order,
broadcast an auction initiation message of the auction, via the network, to a plurality of market participants without indicating an auction duration, the market participants comprising the one or more broker system computers, said auction duration ending upon termination of the random timer,
receive, responsive to the auction initiation message, over the network via the one or more broker system computers, one or more auction participant responses from a plurality of auction participants comprising a subset of the market participants only during the auction duration, and declining auction participant responses received after the auction duration,
determine that the random timer has terminated, and
transmit, to an order manager module of the computer server, an instruction that the random timer has terminated; and
match, by the order manager module of the computer server, in response to receiving the instruction that the random timer has terminated, only the auction participant responses received during the auction duration, existing orders in an order book, and a contra guarantee order, the contra guarantee order comprising a contra guarantee price, against the initiating order.

13. The system of claim 12, wherein the auction guarantor acts as a broker for a customer, and the initiating order describes a financial instrument, a volume, and a guaranteed price.

14. The system of claim 12, wherein the random timer is configured to terminate after running for a random time period.

15. The system of claim 12, wherein the market participants comprise agency brokers and brokers.

16. The system of claim 15, wherein the auction participant responses each include price and volume information for an auction participant.

17. The system of claim 12, wherein the computer server is configured to initiate, broadcast, receive responses, determine, and match, responsive to determining that the initiating order meets an execution criteria.

18. The system of claim 12, wherein the computer server is configured to match according to a price-based priority and a time-based allocation priority.

19. The system of claim 12, wherein, the random timer terminates after running for a minimum time period plus some additional random increment of time under a maximum time period.

20. The system of claim 19, wherein the computer server is further configured to:
  determine, by the auction manager module of the computer server, when the random timer has run for the minimum time period;
  determine, by the auction manager module of the computer server, when the random timer should continue running based on a random binary decision, responsive to determining that the random timer has run for the minimum time period; and
  run, by the auction manager module of the computer server, the random timer for an additional random time period, responsive to determining that the random timer should continue running.

21. A non-transitory computer readable medium configured to store instructions for reducing data surges executable by a computer processor, the instructions, when executing, causing the computer processor to:
  in a system environment comprising one or more broker system computers in communication with a computing system through a network:
  receive, by the computer processor, an initiating order from among said one or more broker system computers associated with an auction guarantor, the auction guarantor acting as a broker for a customer, and the initiating order describing a financial instrument, a volume, a side, and an initiating price;
  automatically activate, by the computer processor, an auction manager module when the initiating order is received, the activated auction manager module comprising specialized instructions that, when executed, cause the auction manager module to perform certain initiating functions relating to an auction and auction controls that reduce an influx of auction data to the computing system at or near the end of the auction, the auction manager module performing the initiating functions to:
    initiate a random timer in response to the initiating order, the random timer configured to terminate after running for a random time period,
    broadcast an auction initiation message of the auction, via the network, to a plurality of market participants without indicating an auction duration, said auction duration ending upon termination of the random timer, the market participants comprising the one or more broker system computers,
    receive, responsive to the auction initiation message, over the network via the one or more broker system computers, a plurality of auction participant responses from one or more auction participants only during the auction duration and declining auction participant responses received after the auction duration, the auction participants comprising a subset of the market participants, and the auction participant responses each including price and volume information for an auction participant,
    determine that the random timer has terminated, and transmit, to an order manager module, an instruction that the random timer has terminated; and
  cause the order manager module to match, responsive to receiving the instruction that the random timer has terminated, only the auction participant responses received during the auction duration, existing orders in an order book of an electronic trading system, and a contra guarantee order, the contra guarantee order comprising a contra guarantee price, against the initiating order.

22. The computer readable medium of claim 21, wherein the instructions for initiating, broadcasting, receiving responses, determining, and matching are executed responsive to determining that the initiating order meets an execution criteria.

23. The computer readable medium of claim 21, wherein the instructions for matching match according to a price-based priority and a time-based allocation priority.

24. The computer readable medium of claim 21, wherein, the random timer terminates after running for a minimum time period plus some additional random increment of time under a maximum time period.

25. The computer readable medium of claim 24, further comprising instructions that cause the processor to:
  determine, by the auction manager module, when the random timer has run for the minimum time period;
  determine, by the auction manager module, when the random timer should continue running based on a random binary decision, responsive to determining that the random timer has run for the minimum time period; and
  run, by the auction manager module, the random timer for an additional random time period, responsive to determining that the random timer should continue running.

26. An electronic computing system for reducing data surges within a system environment comprising one or more broker system computers in communication with the electronic computing system through a network, the electronic computing system comprising a computer server comprising at least one processor executing computer-readable instructions stored in a non-transitory memory that causes the computer server to:
  receive an initiating order from among said one or more broker system computers associated with an auction guarantor, the auction guarantor acting as a broker for a customer, and the initiating order describing a financial instrument, a volume, a side, and an initiating price;
  automatically activate an auction manager module when the initiating order is received, the activated auction manager module comprising specialized instructions that, when executed, cause the auction manager module to perform certain initiating functions relating to an auction and auction controls that reduce an influx of auction data to the computer server at or near the end of the auction, the auction manager module performing the initiating functions to:

initiate a random timer in response to the initiating order, the random timer configured to terminate after running for a random time period, broadcast an auction initiation message of the auction, via the network, to a plurality of market participants without indicating an auction duration, said auction duration ending upon termination of the random timer, the market participants comprising the one or more broker system computers, receive, responsive to the auction initiation message, over the network via the one or more broker system computers, a plurality of auction participant responses from one or more auction participants only during the auction duration and declining auction participant responses received after the auction duration, the auction participants comprising a subset of the market participants, and the auction participant responses each including price and volume information for an auction participant, determine that the random timer has terminated, and transmit, to an order manager module of the computer server, an instruction that the random timer has terminated; and match, by the order manager module of the computer server, responsive to receiving the instruction that the random timer has terminated, only the auction participant responses received during the auction duration, existing orders in an order book of the electronic trading system, and a contra guarantee order, the contra guarantee order comprising a contra guarantee price, against the initiating order.

* * * * *